(12) United States Patent  
Carvalho

(10) Patent No.: US 7,422,419 B2
(45) Date of Patent: Sep. 9, 2008

(54) PROPELLER BLADE RETENTION SYSTEM

(75) Inventor: Paul Armand Carvalho, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 586 days.

(21) Appl. No.: 11/205,445

(22) Filed: Aug. 17, 2005

(65) Prior Publication Data

US 2007/0041839 A1 Feb. 22, 2007

(51) Int. Cl.
 *B64C 11/06* (2006.01)
(52) U.S. Cl. ..................... 416/205; 416/239
(58) Field of Classification Search .................. 416/239, 416/205
See application file for complete search history.

(56) References Cited

U.S. PATENT DOCUMENTS

| 4,850,801 | A |   | 7/1989  | Valentine      |         |
|-----------|---|---|---------|----------------|---------|
| 5,022,824 | A |   | 6/1991  | Violette et al.|         |
| 5,022,825 | A |   | 6/1991  | Violette et al.|         |
| 5,035,576 | A |   | 7/1991  | Byrnes et al.  |         |
| 5,102,300 | A |   | 4/1992  | Violette et al.|         |
| 5,118,256 | A | * | 6/1992  | Violette et al.| 416/134 R |
| 5,269,658 | A |   | 12/1993 | Carlson et al. |         |
| 6,015,264 | A |   | 1/2000  | Violette et al.|         |
| 6,077,040 | A |   | 6/2000  | Pruden et al.  |         |
| 6,213,719 | B1|   | 4/2001  | Violette et al.|         |
| 6,305,905 | B1|   | 10/2001 | Nagle et al.   |         |

FOREIGN PATENT DOCUMENTS

| EP | 822137 A2    | * | 2/1998  |
|----|--------------|---|---------|
| EP | 0 822 137 A3 |   | 3/1999  |
| FR | 2 877 917    |   | 11/2004 |
| FR | 2877917 A1   | * | 5/2006  |
| FR | 2877917      |   | 11/2006 |
| GB | 2 244 525 A  |   | 12/1991 |
| GB | 2244525 A    | * | 12/1991 |
| GB | 2 409 708    |   | 7/2005  |
| GB | 2 409 708 A  |   | 7/2005  |
| GB | 2409708 A    | * | 7/2005  |

OTHER PUBLICATIONS

Search Report GB0615821.6.
United Kingdom Search Report for Application No. GB0615821.6, Jul. 24, 2007.

* cited by examiner

*Primary Examiner*—Richard Edgar
(74) *Attorney, Agent, or Firm*—Carlson, Gaskey & Olds

(57) ABSTRACT

A propeller blade mounted with a preload adjacent a propeller blade root retention that increases the moment capacity of the retention for a given pitch diameter, yet permits pitching of the propeller blade about a blade axis in response to a propeller pitch change actuation system. During assembly, the preload condition is established by preload springs which apply a load on the end of a tapered roller bearing set as a floating race is rotated which allows the tapered roller bearing set to progressively push the propeller blade root outboard and the floating race inboard to generate the preloaded condition.

19 Claims, 11 Drawing Sheets

PROPELLER BLADE RETENTION SYSTEM

The present invention relates to a propeller blade system, and more particularly, to a tapered roller bearing retention system and an assembly method therefore.

Aircraft propeller blade systems include propeller blades which have root portions that extend through a hub arm of a propeller system blade hub assembly. The propeller blades are secured to and rotatable relative to the hub arm via a retention assembly. Typically, the retention assembly includes a multitude of bearing assemblies which permit the rotation of the blade within the hub arm to permit blade pitch change.

Aircraft propeller blades typically utilize composite materials to produce lightweight blades capable of supporting the operating loads. These operating loads include a centrifugal force component which acts in a direction along the longitudinal axis of the propeller blade. Historically, retention systems of non-preloaded propeller blades rely on the centrifugal load generated by the weight of the blade structure during operation to increase the moment capacity of the blade retention for load carrying capability, especially steady and cyclic bending loads. Furthermore, the moment capacity of non-preloaded retention systems is typically a function of the pitch diameter of the bearing assemblies. The pitch diameter of the retention bearing is directly related to the size and weight of the hub structure. As propeller blades have decreased in weight through the use of composite materials, the retention systems of non-preloaded propeller blades have been altered to provide a preload for increasing the moment capacity of the blade retention. These alterations have often resulted in relatively complex and relatively heavy pre-loaded retention systems.

Conventional pre-loaded propeller retention systems are often preloaded by a relatively large threaded hub retention component which provides a stiff load path along the blade. Although effective, threaded attachments have the inherent limitation of introducing stress concentrations in the hub which operate under high cyclic fatigue loading. The threaded hub portions may also be difficult to monitor and retain the initial preload over long periods of service time. In addition, special tools are often required to apply the relatively high preload necessary to the relatively large hub components which may increase maintenance complexity.

Accordingly, it is desirable to provide a propeller blade retention assembly which increases the moment capacity of the retention system for a given pitch diameter, yet yields a reduction in maintenance complexity over typical preloaded retentions and does not introduce stress concentrations in the hub structure

SUMMARY OF THE INVENTION

A propeller blade retention assembly according to the present invention applies a preload to a propeller blade root generally along a blade axis which increases the moment capacity of the retention for a given pitch diameter. The propeller blade retention assembly is supported within a hub barrel by an inner retention ball bearing set, an outboard retention ball bearing set and a tapered roller bearing set. The tapered roller bearing set runs between a floating race and a propeller blade root as maintained by an end cap which is fastened to the floating race. The preload condition is generated by the tapered roller bearing set which pushes the propeller blade root outboard along the blade axis and the floating race inboard along the blade axis. The preload provides relatively stiff blade retention, yet permits pitching of the propeller blade root about the blade axis.

The preload condition is produced in an uncomplicated manner which facilitates routine maintenance and repair in a field environment. The preload condition is established by a multiple of preload springs or some other relatively constant load device which apply a load on the end of the tapered rollers through the end cap as the floating race is rotated in a continuous direction or rotated back and forth which allows the tapered roller bearing set to progressively push the propeller blade root outboard and the floating race inboard generating the preloaded condition. The movement along the axis of the roller elements is possible due to a combination of a low rolling coefficient of friction and a slightly tipped roller element that precesses inward in a helical path. Once the preload process is completed, the tapered roller bearing set is retained by a higher static coefficient of friction.

The present invention therefore provides a pre-loaded blade retention assembly which increases the moment capacity of the retention system for a given pitch diameter, yet yields a reduction in maintenance complexity.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
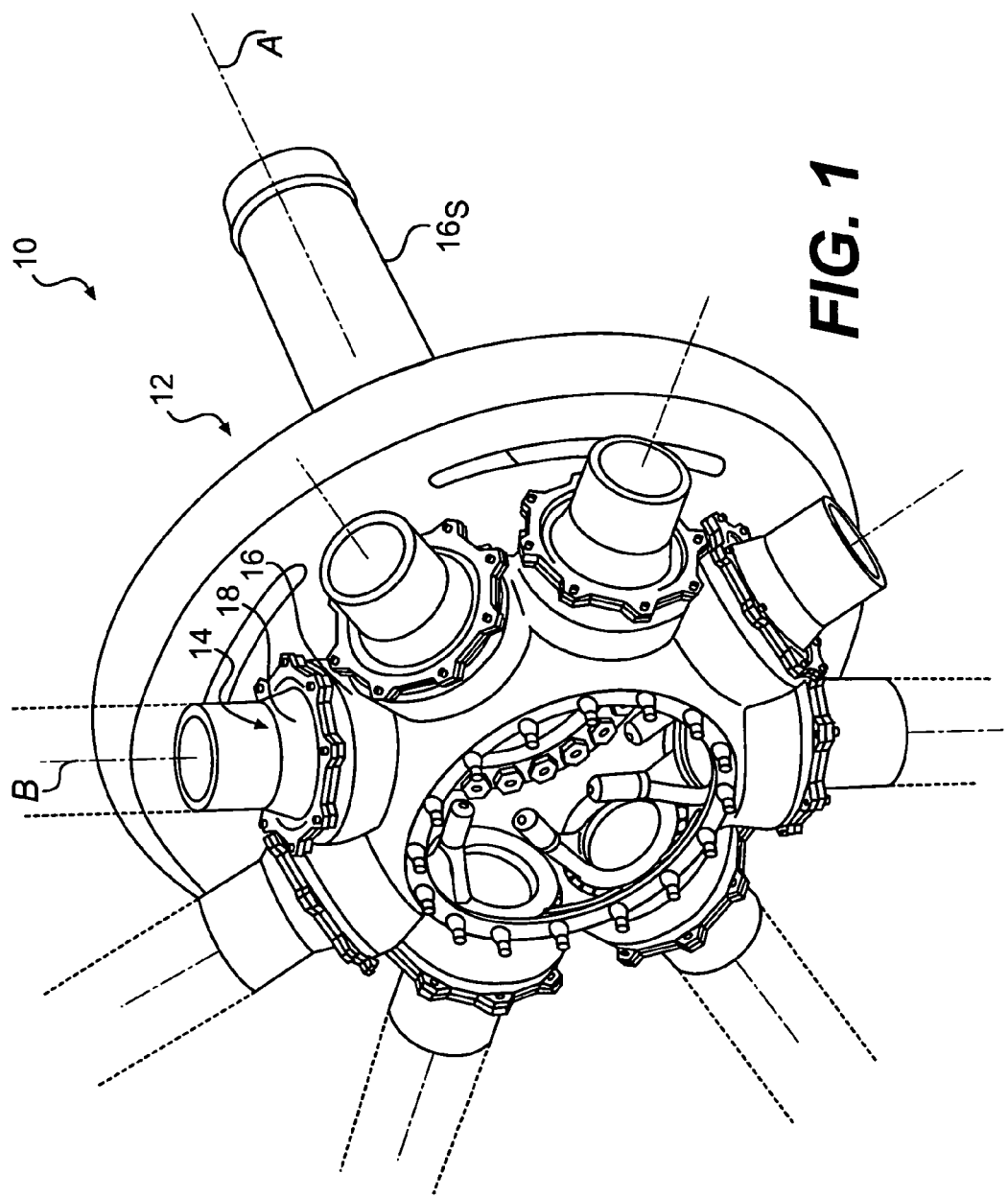
FIG. 1 is a general perspective front view of a propeller blade retention system.

FIG. 1 illustrates a general perspective view of a propeller system 10. The propeller system 10 includes a hub assembly 12 which supports a multiple of pre-loaded propeller blade retention assemblies 14 (eight shown; each without the blade airfoil portion). It should be understood that although a propeller blade retention system typical of a turboprop aircraft is illustrated in the disclosed embodiment, various rigid prop/rotor blade systems including tilt rotor and tilt wing systems which requires a pre-load retention will benefit from the present invention.

The hub assembly 12 includes a hub barrel 16. The hub barrel 16 is the primary structural support for each propeller blade retention assembly 14. In accordance with the present invention, the hub barrel 16 may be formed integrally into a single, one-piece hub which in addition to providing a mounting location for the blades, may house the propeller system's 10 pitch control system. It should be understood that various hub assembly constructions will be usable with the present invention.

The hub assembly 12 is mounted to a propeller drive shaft 16S which extends transversely therefrom such that the propeller system 10 may be driven about an axis of rotation A. Each propeller blade retention assembly 14 defines a blade axis B transverse to the axis of rotation A.

Figure 2:
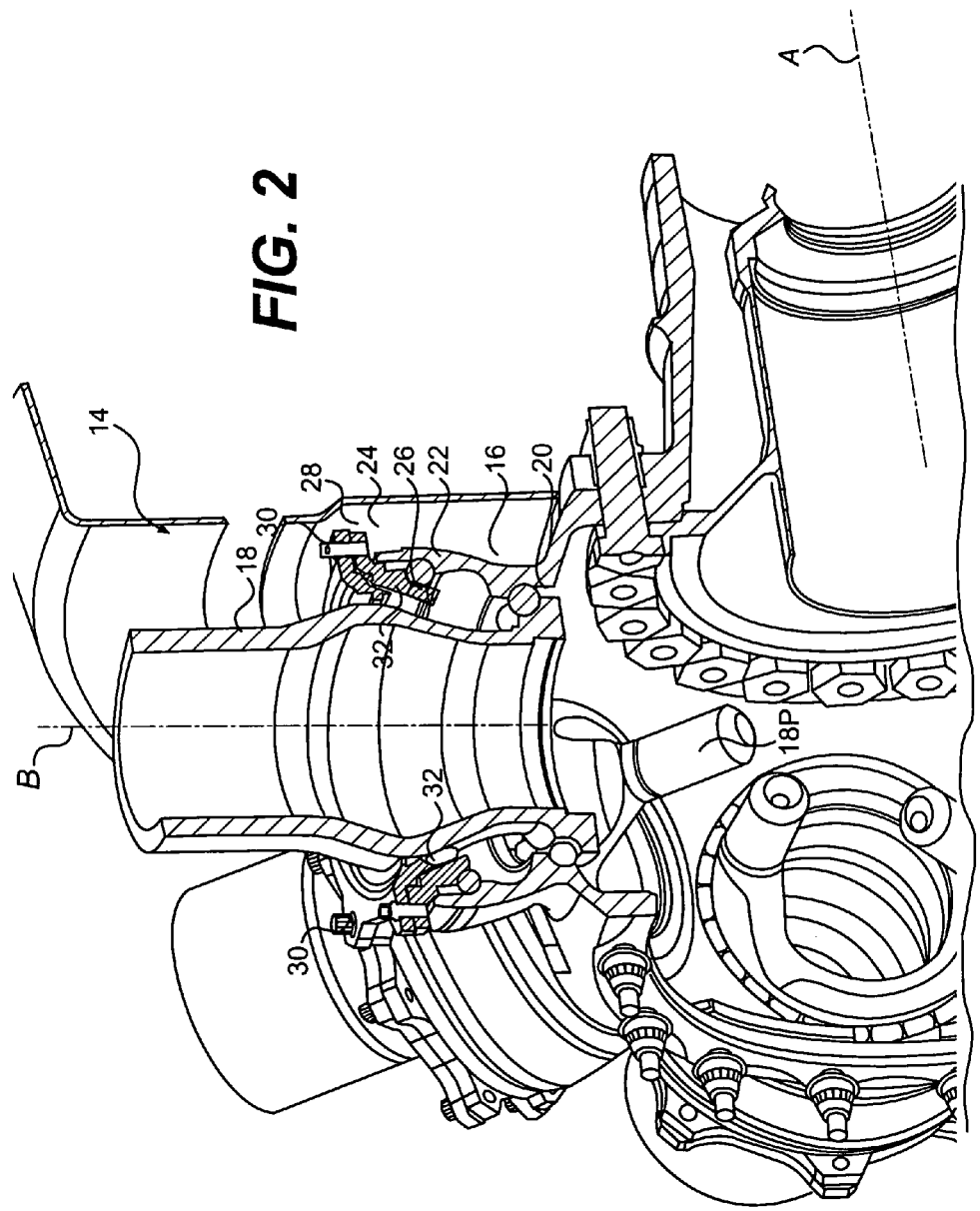
FIG. 2 is a partial sectional view of the propeller blade retention system.
Figure 3:
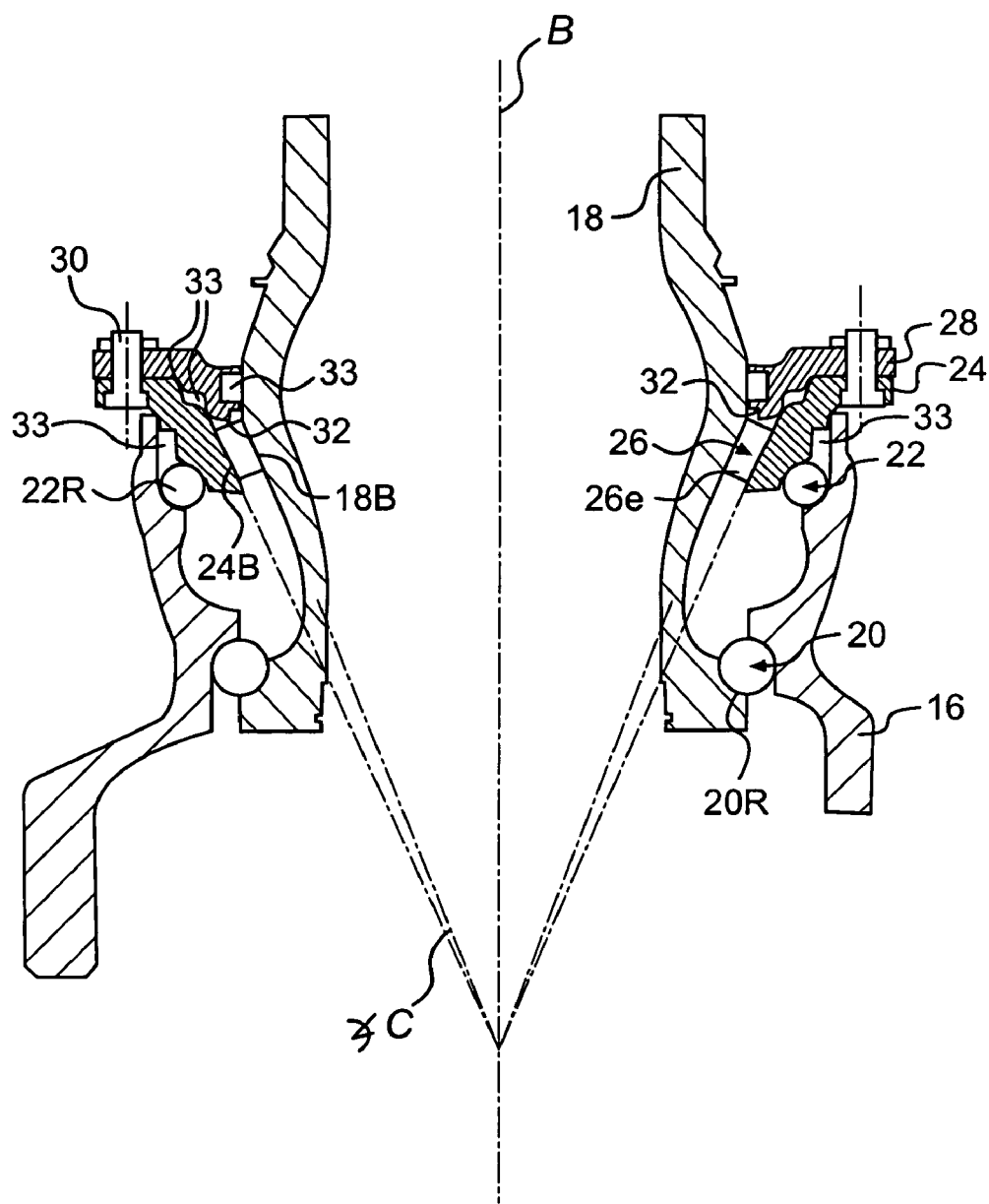
FIG. 3 is a sectional view of a propeller blade retention assembly.

Referring to FIG. 2, each propeller blade retention assembly 14 includes a propeller blade root 18, an inner retention ball bearing set 20, an outboard retention ball bearing set 22, a floating race 24, a tapered roller bearing 26, and an end cap 28 (also illustrated in FIG. 3). It should be understood that the propeller blade root 18 as illustrated may be a section of a complete propeller blade, or a retention portion which receives a removable blade airfoil portion of a propeller blade.

The propeller blade retention assembly 14 applies a preload to the propeller blade root 18 generally along the blade axis B which increases the moment capacity of the retention for a given pitch diameter, yet permits pitching of the propeller blade root 18 about the blade axis B in response to a propeller pitch change actuation system which interacts with a blade pitch pin 18*p*. Notably, each propeller blade retention assembly 14 is essentially identical, such that only a single propeller blade retention assembly 14 need be specifically described herein.

Referring to FIG. 3, the propeller blade retention assembly 14 is supported within the hub barrel 16 by the inner retention ball bearing set 20, the outboard retention ball bearing set 22 and the tapered roller bearing set 26 which extend about a perimeter of the propeller blade root 18. An inner pitch diameter is defined by the inner retention ball bearing set 20 which runs in an inboard race 20R defined between the hub barrel 16 and the propeller blade root 18. An outer pitch diameter is defined by the outboard retention ball bearing set 22 which runs in an outboard race 22R defined between the hub barrel 16 and the floating race 24. The inner pitch diameter preferably defines a diameter smaller than the outer pitch diameter.

The tapered roller bearing set 26 runs between the floating race 24 and the propeller blade root 18 as maintained by the end cap 28 which is fastened to the floating race 24 through a multitude of threaded fasteners 30 (also illustrated in FIG. 2) such as a bolt or the like. The threaded fastener 30 is located generally parallel to the blade axis B to maintain the end cap 28 and the floating race 24 in facial engagement such that an end cap nose 32 contacts the tapered roller bearing 26. Notably, the end cap 28 is in facial engagement with the floating race 24—not threaded thereto—such that stress concentrations are minimized and the threaded fasteners 30 provide multiple redundant load paths. The end cap nose 32 positions the tapered roller bearing set 26 between the end cap 28 and the floating race 24 to provide the preload condition.

Each tapered roller bearing element 26*e* of the tapered roller bearing set 26 defines a cone angle C which intersects the blade axis B. The tapered roller bearing set 26 runs between a floating race bearing surface 24B of the floating race 24 and a propeller blade root bearing surface 18B of the propeller blade root 18. The floating race bearing surface 24B and the propeller blade root bearing surface 18B are also defined along a cone angle such that the floating race bearing surface 24B is an inner surface which faces toward the blade axis B and the propeller blade root bearing surface 18B is an outer surface which faces away from the blade axis B. In other words, a frustro-conical interface is formed about the blade axis B to receive the tapered roller bearing set 26.

The preload condition is generated by the tapered roller bearing set 26 which pushes the propeller blade root 18 outboard along the blade axis B and the floating race 24 inboard along the blade axis B. The outboard retention ball bearing set 22 provides lower rolling element friction in which pitch change results in rotation at the inner retention ball bearing set 20 and outboard retention ball bearing set 22 during pitch change. The tapered roller bearing set 26 has a potentially higher friction and need not rotate. The outboard retention ball bearing set 22 also provides a softer preloaded joint allowing for wear without loss of preload. The preload provides relatively stiff blade retention, yet permits pitching of the propeller blade root 18 about the blade axis B by allowing rotation at 22.

Preferably, one or more seals 33 are located between the propeller blade root 18 and the end cap; the end cap 28 and the floating race 24; and the floating race 24 and the hub barrel 16. It should be understood that various seal arrangements may be utilized with the present invention.

Figure 4:
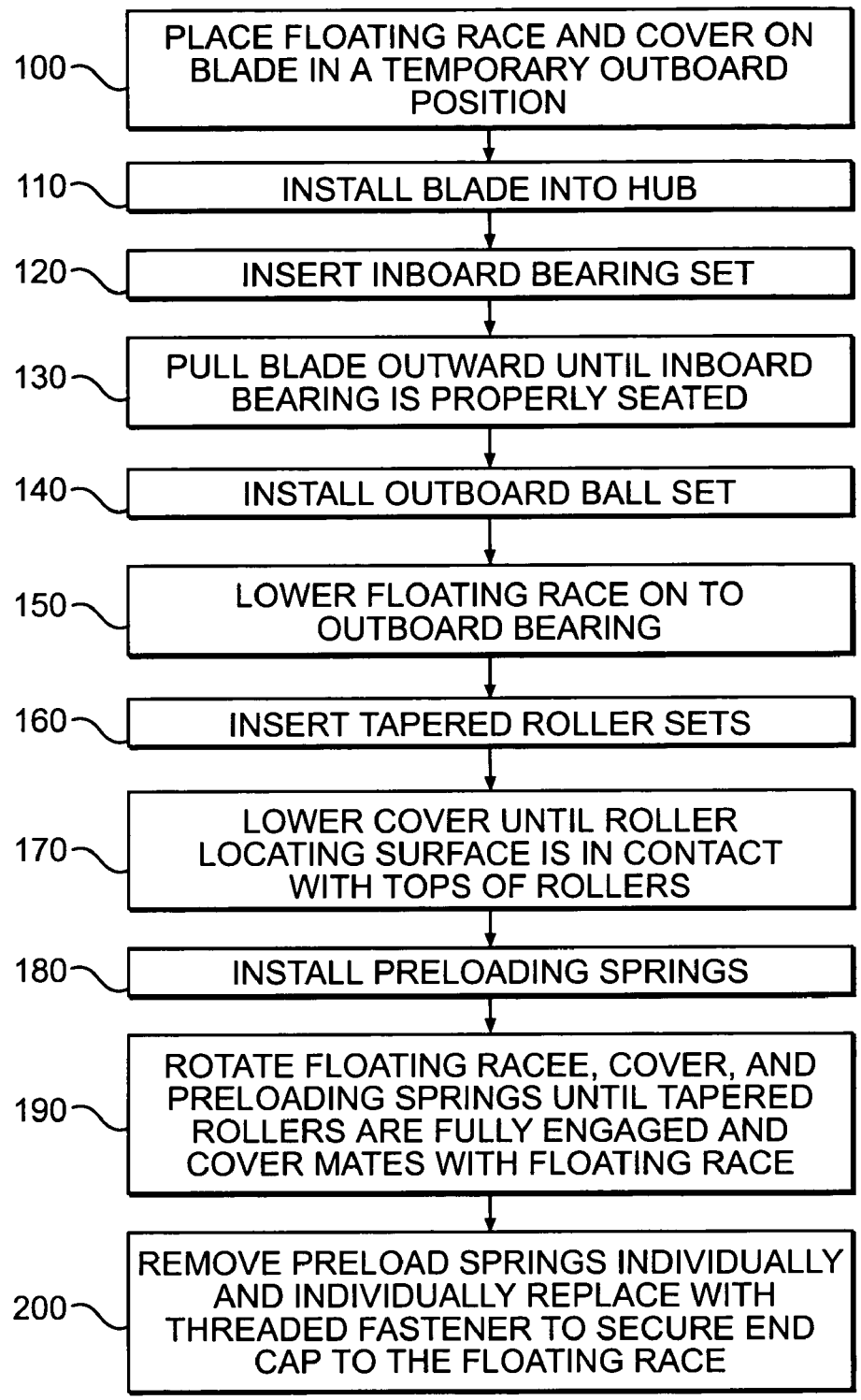
FIG. 4 is a flow chart which illustrates an assembly method to the propeller blade retention system.
Figure 5A:
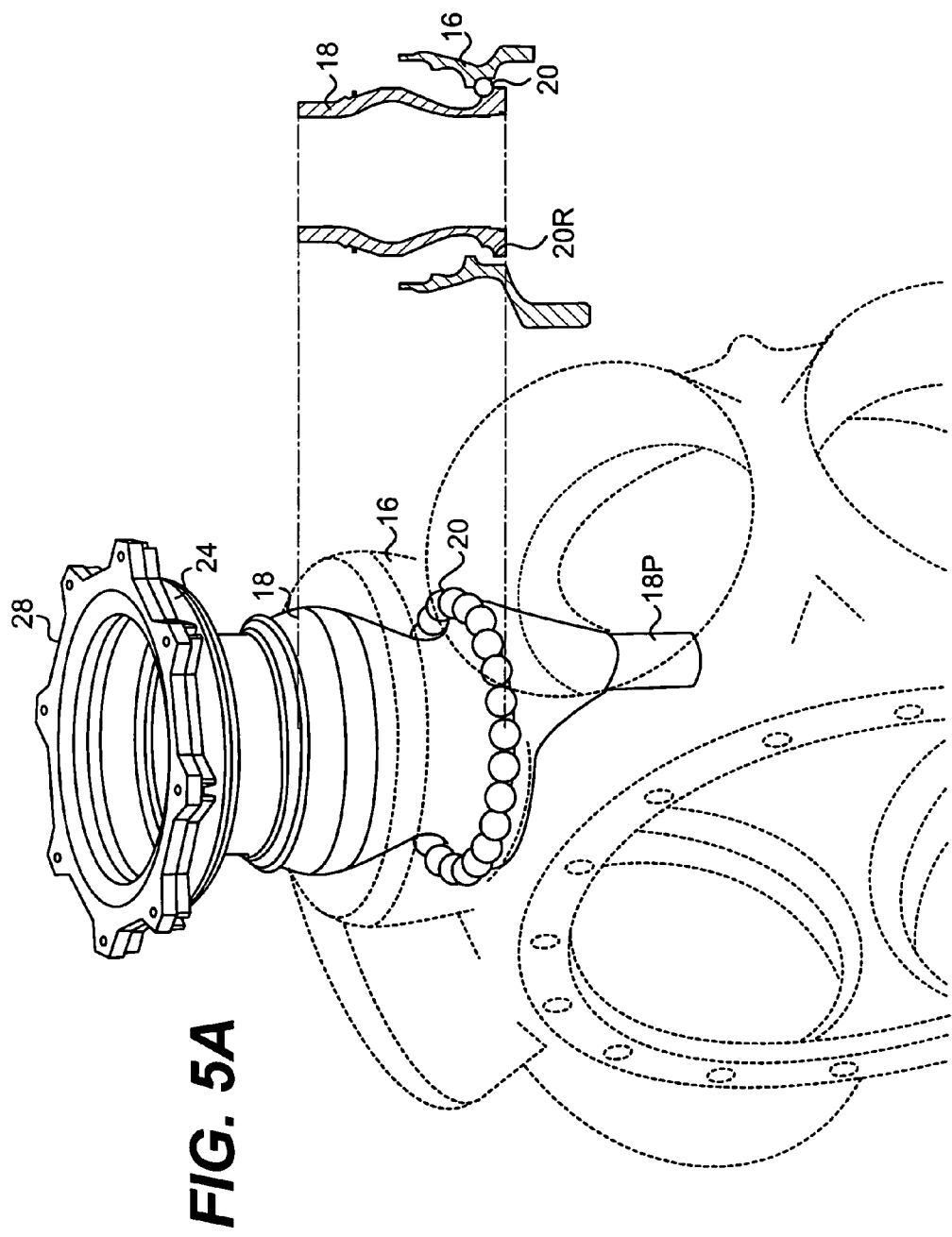
FIG. 5A is a perspective view illustrating a step of the assembly method of FIG. 4.

Referring to FIG. 4, the preload condition is produced in an uncomplicated manner which facilitates routine maintenance and repair in a field environment. In step 100, the floating race 24 and the end cap 28 are located over the propeller blade root 18 in a temporary outboard position away from the hub barrel 16 (FIG. 5A). In step 110, the propeller blade root 18 is installed into the hub barrel 16. In step 120, the inboard retaining ball bearing set 20 is located within the inboard race 20R between the propeller blade root 18 and the hub barrel 16. In step 130, the propeller blade root 18 is partially retracted outboard relative the hub barrel 16 such that the inboard retaining ball bearing set 20 seated within the inboard race 20R.

Figure 5B:
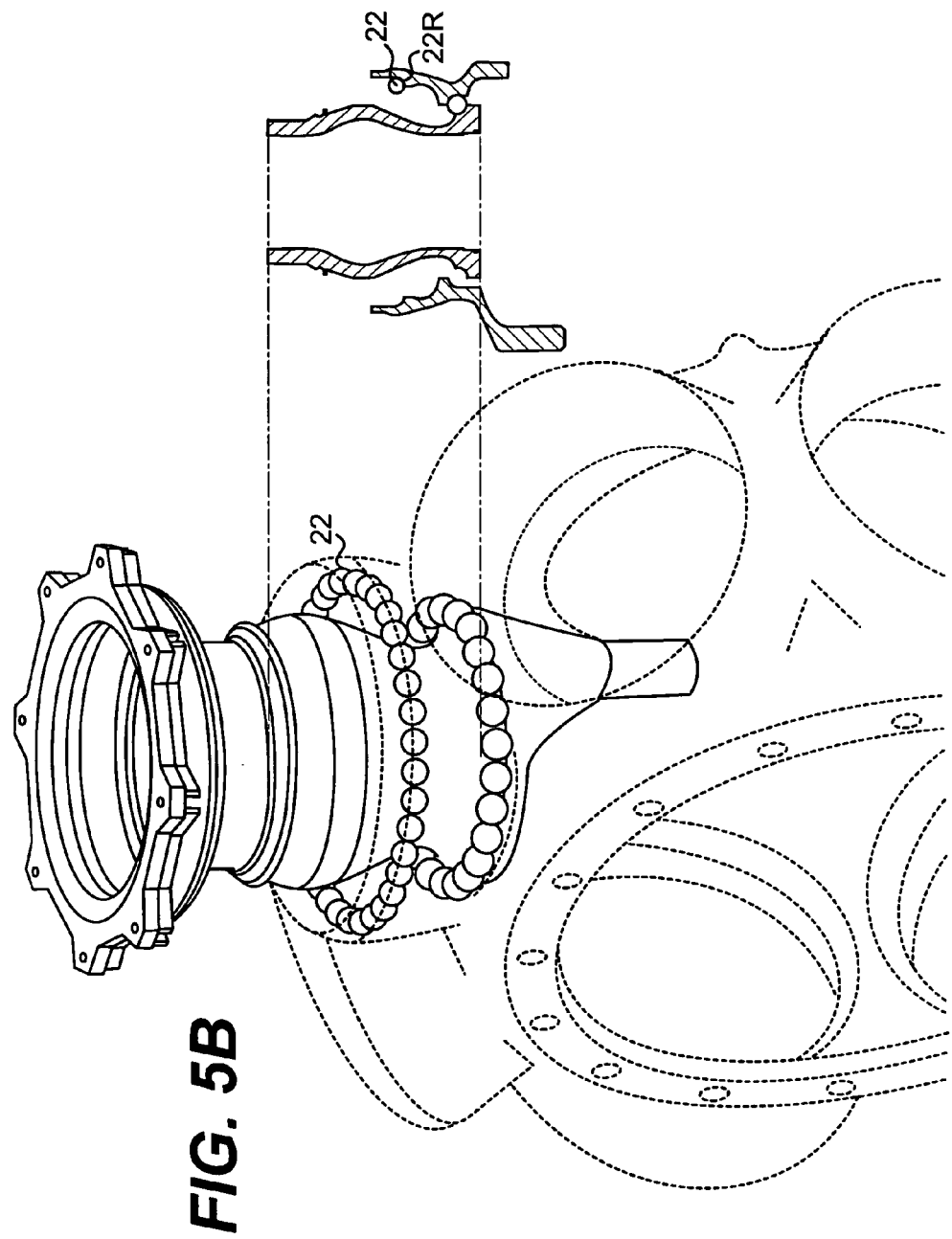
FIG. 5B is a perspective view illustrating a step of the assembly method of FIG. 4.

In step 140, the outboard retention ball bearing set 22 is located within a portion of the outer race 22R defined by the floating race 24 (FIG. 5B). The outboard retention ball bearing set 22 permits the floating race 24 to be rotated for assembly purposes otherwise the propeller blade root 18 would have to be rotated which may not be possible as the airfoils of adjacent propeller blades may touch.

Figure 5C:
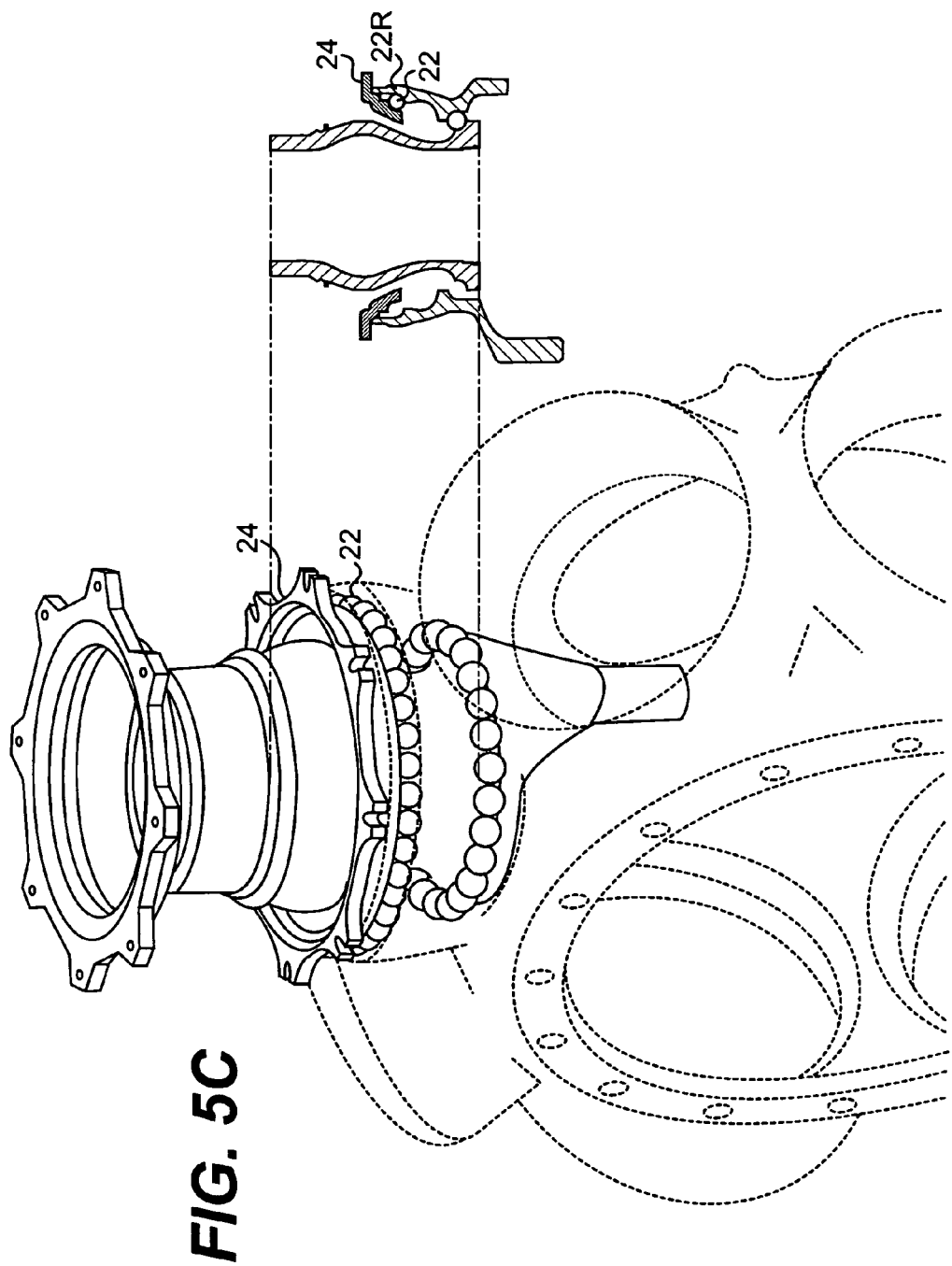
FIG. 5C is a perspective view illustrating a step of the assembly method of FIG. 4.

In step 150, the floating race 24 is lowered onto the outboard retaining bearing set 22 to complete the outer race 22R formed between the floating race 24 and the hub barrel 16 (FIG. 5C).

Figure 5D:
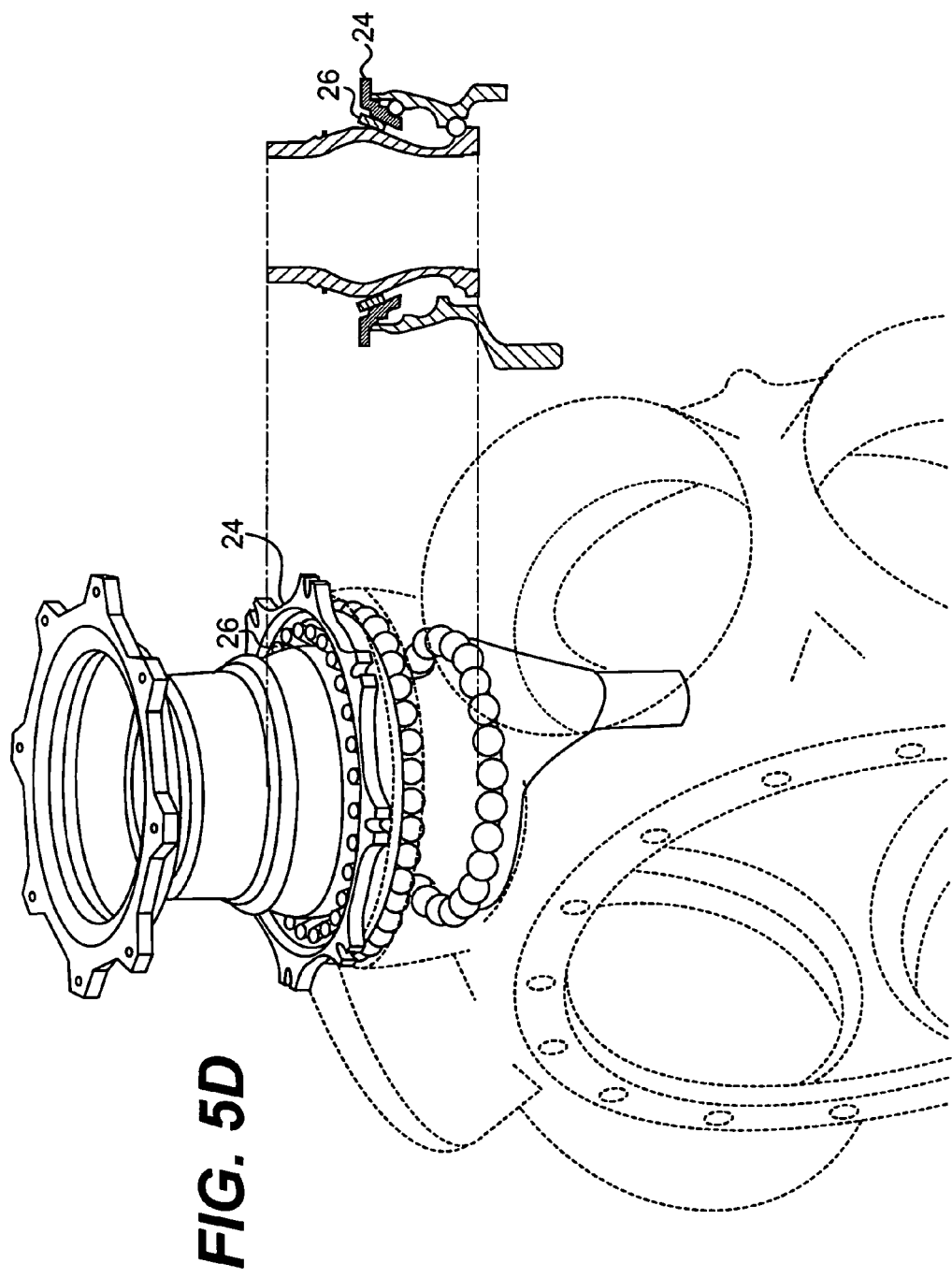
FIG. 5D is a perspective view illustrating a step of the assembly method of FIG. 4.

In step 160, the tapered roller bearing set 26 is installed between the floating race 24 and the propeller blade root 18 (FIG. 5D).

Figure 5E:
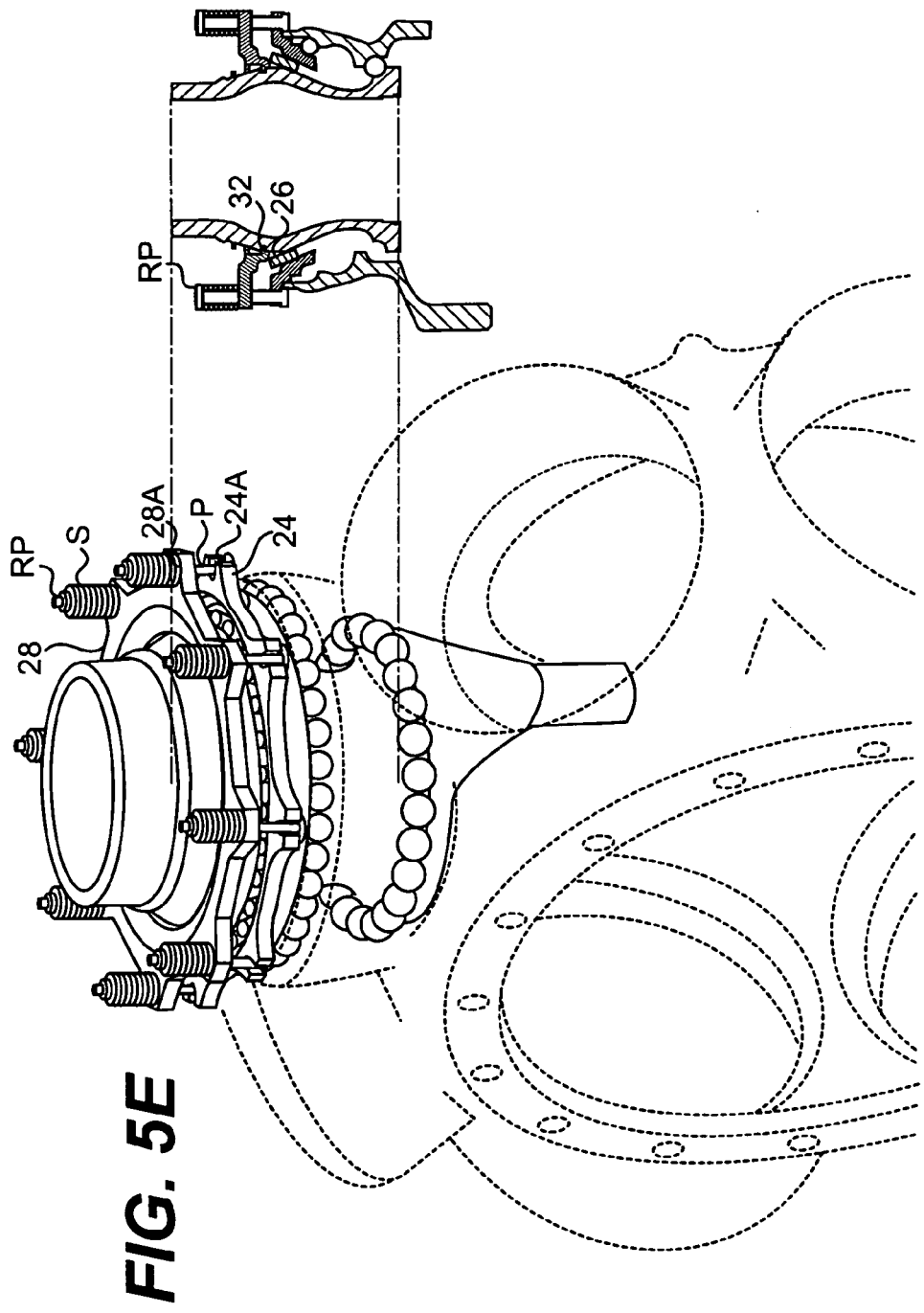
FIG. 5E is a perspective view illustrating a step of the assembly method of FIG. 4.

In step 170, the end cap 28 is lowered onto the tapered roller bearing set 26 until the end cap nose 32 contacts the tapered roller bearing set 26 (FIG. 5E). In step 180, preload springs S are mounted on bolts P which are passed through end cap apertures 28*a* and floating race apertures 24*a*.

The preload springs S bias the end cap 28 toward the floating race 24. A nut Rp threaded to the preload bolt P selectively retains the spring S on the preload bolt P. The nut Rp is then torqued to create a state of compression on the preload spring S. It should be understood that other preload devices and fixtures may alternatively be utilized to apply a preload which biases the end cap 28 toward the floating race 24 during installation.

Figure 5F:
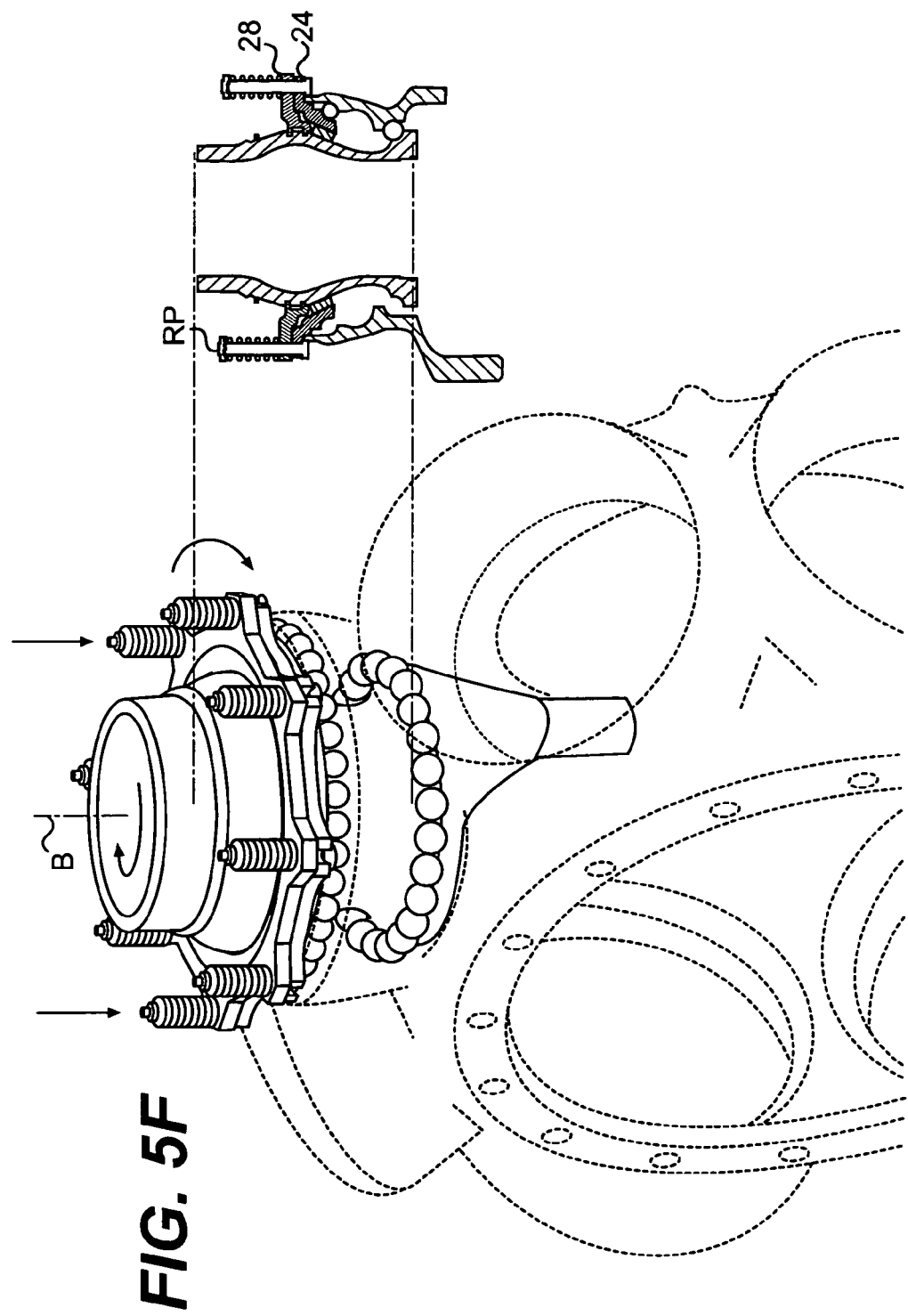
FIG. 5F is a perspective view illustrating a step of the assembly method of FIG. 4.

In step 190, the floating race 24, end cap 28, and preload springs S are rotated until the tapered roller bearing set 26 is fully installed. The tapered roller bearing set 26 are preferably fully seated when the end cap 28 mates in facial engagement with the floating race 24 (FIG. 5F). The preload condition is initially established by the preload springs S which apply a load on the end of the tapered roller elements as the floating race 24 is rotated which allows the tapered roller bearing set 26 to progressively push the propeller blade root 18 outboard and the floating race 24 inboard along the axis B generating the preloaded condition. That is, the springs S maintain an axial roller end load as the roller bearing element progressively engage the conical space between the floating race 24 and the propeller blade root 18. This axial end load may alternatively or additionally be applied with tooling designed to interface with the outer race.

The movement along the axis of the roller elements 26e is possible due to a combination of a low rolling coefficient of friction and a slightly tipped roller element 26e that processes inward in a helical path. The floating race 24 is important to the application of the preload as the propeller blade would not otherwise be free to rotate when engaged with the propeller pitch actuation system.

Once this process is completed, the tapered roller bearing set 26 is retained in place due to a relative high static coefficient of friction along the blade axis B. Notably, however, the propeller blade root 18 is still free to rotate about the blade axis B in response to pitch change inputs.

Figure 6:
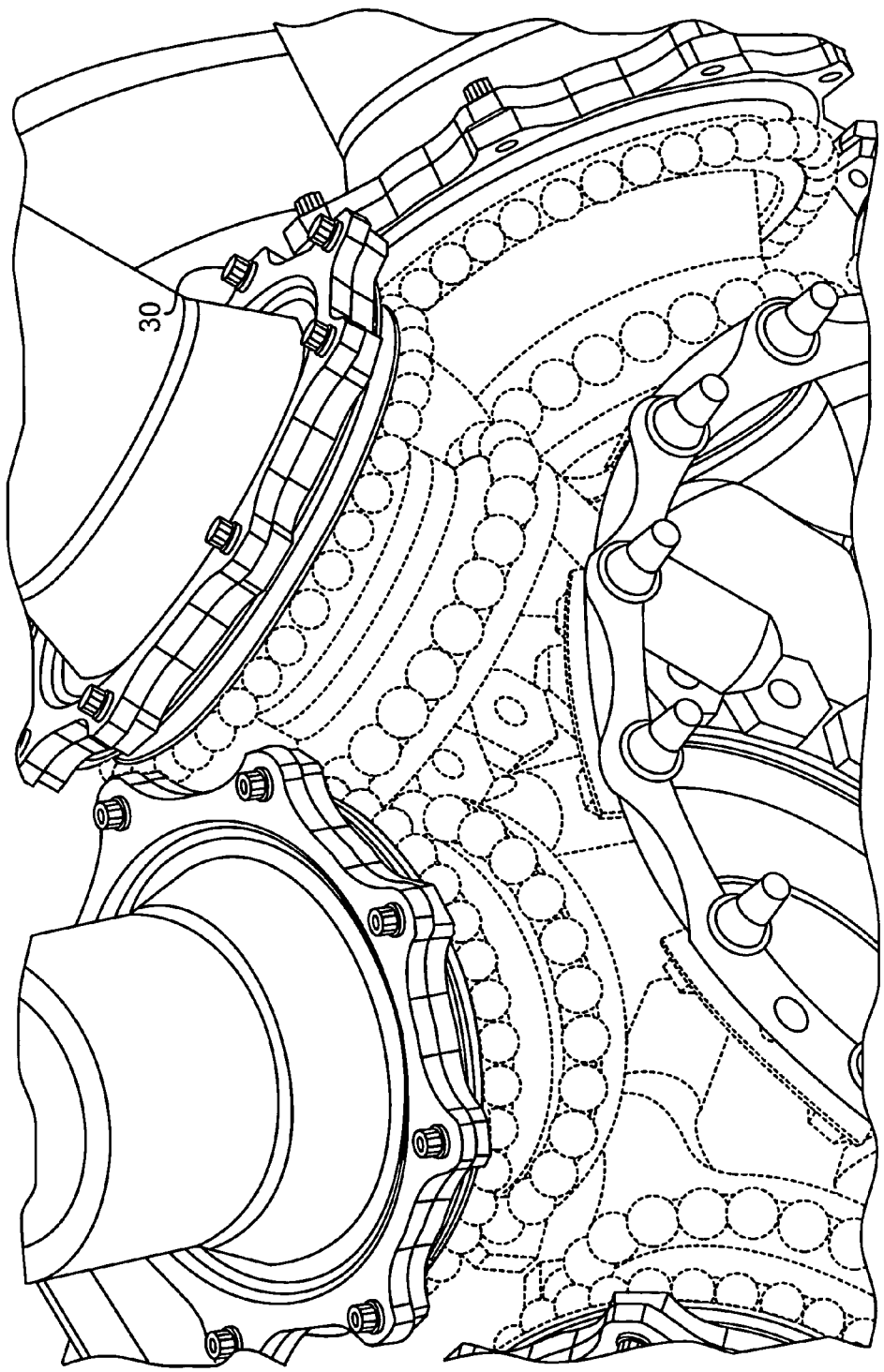
FIG. 6 is a partial phantom perspective view of the propeller blade retention system in an assembled condition.

In step 200, the nut Rp is removed from the bolt P and each preload spring S and bolt P are removed and replaced by the threaded fastener 30 (FIG. 6) into each of the end cap apertures 28a and floating race apertures 24a. It should be understood that each nut Rp, the bolt P and preload spring S may be removed individually or at one time prior to installation of the threaded fastener 30. That is, the tapered roller bearing set 26 is retained in place due to a relative high static coefficient of friction along the blade axis B.

To dissemble the blade assembly 14 from the hub barrel 16, the threaded fasteners 30 are removed. The axial load on the tapered roller bearing set 26 is then removed by rotation of the floating race 24 such that the normal forces on the tapered roller bearing set 26 from the preload and the tapered roller bearing element cone angle result in a self-generated axial load on the tapered roller bearing set 26 which pushes the tapered roller bearing set 26 out of engagement.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A propeller blade retention assembly comprising:
   a propeller blade root which defines a blade axis;
   a hub barrel which at least partially surrounds said propeller blade root;
   a floating race mounted generally between said hub barrel and said propeller blade root;
   a tapered roller bearing set mounted between said floating race and said propeller blade root; and
   an end cap mounted to said floating race to pre-load said propeller blade root relative said hub barrel.

2. The propeller blade retention assembly as recited in claim 1, wherein said floating race defines a floating race bearing surface and said propeller blade root defines a propeller blade root bearing surface, said floating race bearing surface and said propeller blade root bearing surface define a cone angle which intersects said blade axis.

3. The propeller blade retention assembly as recited in claim 1, wherein said floating race defines a floating race bearing surface and said propeller blade root defines a propeller blade root bearing surface, said floating race bearing surface and said propeller blade root bearing surface define a frustro-conical interface about said blade axis.

4. The propeller blade retention assembly as recited in claim 1, wherein said floating race defines a floating race bearing surface and said propeller blade root defines a propeller blade root bearing surface, said floating race bearing surface and said propeller blade root bearing surface define an annular frustro-conical interface about said blade axis.

5. The propeller blade retention assembly as recited in claim 1, further comprising an inboard retaining ball bearing set between said hub barrel and said propeller blade root and an outboard retaining ball bearing set between said floating race and said hub barrel.

6. The propeller blade retention assembly as recited in claim 5, wherein said inboard retaining ball bearing set defines a inboard pitch diameter and said outboard retaining ball bearing set defines an outboard pitch diameter, said inboard pitch diameter smaller than said outboard pitch diameter.

7. The propeller blade retention assembly as recited in claim 1, wherein said end cap is mounted to said floating race through a multitude of threaded fasteners.

8. The propeller blade retention assembly as recited in claim 7, wherein said multitude of threaded fasteners are defined generally parallel to said blade axis.

9. The propeller blade retention assembly as recited in claim 1, wherein said end cap includes an end cap nose which contacts said tapered roller bearing set.

10. A method of assembling a propeller blade retention assembly comprising the steps of:
    (1) locating a propeller blade root into a hub barrel along a blade axis;
    (2) locating a floating race in contact with an outboard retaining ball bearing set within the hub barrel;
    (3) locating a tapered roller bearing set between the floating race and the propeller blade root; and
    (4) locating an end cap into facial engagement with the floating race, the end cap contacting the tapered roller bearing set to pre-load the propeller blade root relative the hub barrel.

11. A method as recited in claim 10, wherein said step (4) further comprises:
    (a) rotating the floating race and the end cap until the end cap contacts the floating race in the facial engagement.

12. A method as recited in claim 11, wherein said step (a) further comprises:
    (i) rotating the floating race and the end cap until the tapered roller bearing set is fully seated between the floating race and the propeller blade root.

13. A method as recited in claim 11, wherein said step (4) further comprises:
    (b) fastening the end cap to the floating race after said step (a).

14. A method as recited in claim 13, wherein said step (b) further comprises:
    (i) threading the fasteners into the floating race and the end cap, the fasteners generally parallel to the blade axis.

15. A method as recited in claim 11, further comprising the steps of:

(5) locating an inboard ball bearing set adjacent an inner race between the propeller blade root and the hub barrel after said step (1);

(6) partially retracting the propeller blade root outboard relative the hub barrel such that the inboard retaining ball bearing set enters the inboard race; and (7) advancing the propeller blade root relative the hub barrel such that the inboard retaining ball bearing set is seated within the inboard race.

16. A method of assembling a propeller blade retention assembly comprising the steps of:

(1) locating a tapered roller bearing set between a floating race and a propeller blade root located within a hub barrel;

(2) biasing an end cap toward the floating race; and (3) rotating the end cap and the floating race until the tapered roller bearing set is seated and the end cap is in facial engagement with the floating race such that the propeller blade root is pre-loaded relative the hub barrel.

17. A method as recited in claim 16, wherein said step (2) further comprises:

(a) mounting a pin through a floating race aperture and an end cap aperture; and (b) mounting a spring onto the pin to bias the end cap toward the floating race.

18. A method as recited in claim 17, further comprising the step of:

(4) removing the pin and the spring from the floating race aperture and the end cap aperture; and (5) threading a threaded fastener into the floating race aperture and the end cap aperture to maintain the end cap is in facial engagement with the floating race.

19. A method as recited in claim 16, wherein said step (3) further comprises:

(a) processing the tapered roller bearing set inward in a helical path.

* * * * *